(12) United States Patent
Demos

(10) Patent No.: US 7,366,242 B2
(45) Date of Patent: Apr. 29, 2008

(54) MEDIAN FILTER COMBINATIONS FOR VIDEO NOISE REDUCTION

(75) Inventor: Gary A. Demos, Culver City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 844 days.

(21) Appl. No.: 10/814,350

(22) Filed: Mar. 30, 2004

(65) Prior Publication Data

US 2004/0196901 A1     Oct. 7, 2004

Related U.S. Application Data

(60) Division of application No. 09/545,233, filed on Apr. 7, 2000, now Pat. No. 6,728,317, which is a continuation-in-part of application No. 09/442,595, filed on Nov. 17, 1999, now abandoned, which is a continuation of application No. 09/217,151, filed on Dec. 21, 1998, now Pat. No. 5,988,863, which is a continuation of application No. 08/594,815, filed on Jan. 30, 1996, now Pat. No. 5,852,565.

(51) Int. Cl.
*H04N 7/12* (2006.01)
*G06K 9/36* (2006.01)

(52) U.S. Cl. .................. 375/240.29; 382/236

(58) Field of Classification Search ........... 375/240.21, 375/240.16, 240.29; 348/441, 620; 382/103
See application file for complete search history.

(56) References Cited

U.S. PATENT DOCUMENTS

| | | | |
|---|---|---|---|
| 4,903,317 A | 2/1990 | Wu et al. | |
| 5,253,058 A | 10/1993 | Gharavi | |
| 5,270,813 A | 12/1993 | Puri et al. | |
| 5,387,940 A | 2/1995 | Kwok et al. | |
| 5,408,270 A | 4/1995 | Lim | |
| 5,414,469 A | 5/1995 | Gonzales et al. | |
| 5,418,571 A | 5/1995 | Ghanbari | |
| 5,465,119 A | 11/1995 | Demos | |
| 5,493,338 A * | 2/1996 | Hong | 348/441 |
| 5,519,453 A * | 5/1996 | Wischermann | 348/620 |
| 5,737,027 A | 4/1998 | Demos | |
| 5,742,343 A | 4/1998 | Haskell et al. | |
| 5,828,788 A | 10/1998 | Chiang et al. | |
| 5,852,565 A | 12/1998 | Demos | |
| 5,974,159 A | 10/1999 | Lubin et al. | |

(Continued)

FOREIGN PATENT DOCUMENTS

CA     2127151     3/1995

(Continued)

OTHER PUBLICATIONS

Girod, "Motion-Compensating Prediction with Fractional Pel Accuracy", *IEEE Transactions on Communications*, vol. 41, No. 4, Apr. 1993, pp. 604-612.

(Continued)

*Primary Examiner*—Gims Philippe
(74) *Attorney, Agent, or Firm*—Fish & Richardson P.C.

(57) ABSTRACT

A technique for improving image compression by preprocessing the image frames. In particular, methods for de-interlacing and noise reduction using combinations of median filters, applied both spatially and temporally, with and without motion analysis, are described.

11 Claims, 2 Drawing Sheets

U.S. PATENT DOCUMENTS

| | | | |
|---|---|---|---|
| 5,988,863 | A | 11/1999 | Demos |
| 6,028,634 | A | 2/2000 | Yamaguchi et al. |
| 6,111,975 | A * | 8/2000 | Sacks et al. ............... 382/103 |
| 6,175,592 | B1 | 1/2001 | Kim et al. |
| 6,252,906 | B1 | 6/2001 | Canfield |
| 6,442,203 | B1 | 8/2002 | Demos |
| 6,728,317 | B1 | 4/2004 | Demos |
| 2002/0003838 | A1 | 1/2002 | Takahashi et al. |
| 2004/0196901 | A1 | 10/2004 | Demos |

FOREIGN PATENT DOCUMENTS

| | | |
|---|---|---|
| EP | 0634871 | 1/1995 |
| JP | 1-140883 | 6/1989 |
| JP | 06-165150 | 6/1994 |
| JP | 06350995 | 12/1994 |
| JP | 7-203426 | 8/1995 |
| WO | 97/28507 | 8/1997 |
| WO | 01/77871 | 10/2001 |

OTHER PUBLICATIONS

Patent Abstracts of Japan, vol. 1995, No. 3 (Apr. 28, 2005) for Japanese Patent Publication JP 06350995, published Dec. 22, 1994, entitled, "Moving Picture Processing Method".

Shen et al., "Adaptive motion vector resampling for compressed video down-scaling", International Conference on Image Processing, vol. 1, pp. 771-774, Oct. 26-29, 1997.

Japanese Office Action, Application Serial No. 2001-574651, dated Mar. 22, 2007, 74 pages.

Office Action, U.S. Appl. No. 11/187,176, dated Aug. 30, 2007, 16 pages.

Office Action, U.S. Appl. No. 11/187,176, dated Jan. 4, 2007, 45 pages.

European Office Action, European Patent Application No. 01924762.6, dated Oct. 11, 2006, 11 pages.

"IEEE Standard Specification for the Implementations of 8×8 Inverse Discrete Cosine Transforms," IEEE Std 1180-1990, The Institute of Electrical and Electronics Engineers, Inc.; United States of America, 13 pages (1991).

Certified English Translation for Japanese Patent Publication No. 01-140883, published Jun. 2, 1989, entitled "Data Coding Method".

English language abstract for JP 06165150, published Jun. 10, 1994, entitled: "Dynamic Picture Coding/Decoding Device".

H.261, ITU-T Telecommunication Standardization Sector of ITU, Line Transmission of non-telephone signals. Video Codec for Audiovisual Services at p X64 kbits, (Mar. 1993), 32 pages.

H. 263 Appendix III, ITU-T Telecommunication Standardization Sector of ITU, Series H: Audiovisual and Multimedia Systems, Infrastructure of audiovisual services—coding of moving video. Video coding for low bit rate communication, Appendix III: Examples for H.263 encoder/decoder implementations, (Jun. 2001), 48 pages.

H.263, ITU-T Telecommunication Standardization Sector of ITU, Series H: Audiovisual and Multimedia Systems, Infrastructure of audiovisual services—coding of moving video. Video coding for low bit rate communication, (Jan. 2005), 226 pages.

ISO/IEC 14496-2 International Standard, Information technology—coding of audio-visual objects-Part 2: visual, 2nd Edition, Amendment 2: Streaming video profile, Feb. 1, 2002, 64 pages.

ISO/IEC 14496-2 International Standard, Information technology—coding of audio-visual objects-Part 2: visual, 2nd Edition, Dec. 1, 2001, 536 pages.

Machine Translation for Japanese Patent Publication No. 07-203426, published Aug. 4, 1995, entitled "Hierarchical Coding and Decoding Device" (22 pages).

Patent Abstract of Japan for Japanese Patent Publication No. 01-140883, published Jun. 2, 1989, entitled "Data Coding Method".

Patent Abstract of Japan for Japanese Patent Publication No. 07-203426, published Aug. 4, 1995, entitled "Hierarchical Coding and Decoding Device".

Puri et al., "Temporal Resolution Scalable Video Coding," Image Processing. 1994 International Conference, IEEE, pp. 947-951 (1994).

Vincent, A., et al., "Spatial Prediction in Scalable Video Coding," International Broadcasting Convention, IEEE Conference Publication No. 413, RAI International Congress and Exhibition Centre, Amsterdam, The Netherlands, Sep. 14-18, 1995, pp. 244-249□.

* cited by examiner

ODD FIELD DE-INTERLACER

EVEN FIELD DE-INTERLACER

DE-INTERLACED FRAME FROM
THREE DE-INTERLACED FIELDS

MEDIAN FILTER COMBINATIONS FOR VIDEO NOISE REDUCTION

CROSS-REFERENCE TO RELATED APPLICATIONS

This application is a divisional of and claims priority to U.S. application Ser. No. 09/545,233 filed on Apr. 7, 2000 now U.S. Pat. No. 6,728,317 (which is incorporated herein in its entirety), which was a continuation-in-part application of U.S. application Ser. No. 09/442,595 filed on Nov. 17, 1999 now abandoned, which was a continuation of U.S. application Ser. No. 09/217,151 filed on Dec. 21, 1998 (now U.S. Pat. No. 5,988,863, issued Nov. 23, 1999), which was a continuation of U.S. application Ser. No. 08/594,815 filed Jan. 30, 1996 (now U.S. Pat. No. 5,852,565, issued Dec. 22, 1998).

TECHNICAL FIELD

This invention relates to electronic communication systems, and more particularly to an advanced electronic television system having enhanced compression, filtering, and display characteristics.

BACKGROUND

The United States presently uses the NTSC standard for television transmissions. However, proposals have been made to replace the NTSC standard with an Advanced Television standard. For example, it has been proposed that the U.S. adopt digital standard-definition and advanced television formats at rates of 24 Hz, 30 Hz, 60 Hz, and 60 Hz interlaced. It is apparent that these rates are intended to continue (and thus be compatible with) the existing NTSC television display rate of 60 Hz (or 59.94 Hz). It is also apparent that "3-2 pulldown" is intended for display on 60 Hz displays when presenting movies, which have a temporal rate of 24 frames per second (fps). However, while the above proposal provides a menu of possible formats from which to select, each format only encodes and decodes a single resolution and frame rate. Because the display or motion rates of these formats are not integrally related to each other, conversion from one to another is difficult.

Further, this proposal does not provide a crucial capability of compatibility with computer displays. These proposed image motion rates are based upon historical rates which date back to the early part of this century. If a "clean-slate" were to be made, it is unlikely that these rates would be chosen. In the computer industry, where displays could utilize any rate over the last decade, rates in the 70 to 80 Hz range have proven optimal, with 72 and 75 Hz being the most common rates. Unfortunately, the proposed rates of 30 and 60 Hz lack useful interoperability with 72 or 75 Hz, resulting in degraded temporal performance.

In addition, it is being suggested by some that interlace is required, due to a claimed need to have about 1000 lines of resolution at high frame rates, but based upon the notion that such images cannot be compressed within the available 18-19 mbits/second of a conventional 6 MHz broadcast television channel.

It would be much more desirable if a single signal format were to be adopted, containing within it all of the desired standard and high definition resolutions. However, to do so within the bandwidth constraints of a conventional 6 MHz broadcast television channel requires compression and "scalability" of both frame rate (temporal) and resolution (spatial). One method specifically intended to provide for such scalability is the MPEG-2 standard. Unfortunately, the temporal and spatial scalability features specified within the MPEG-2 standard (and newer standards, like MPEG-4) are not sufficiently efficient to accommodate the needs of advanced television for the U.S. Thus, the proposal for advanced television for the U.S. is based upon the premise that temporal (frame rate) and spatial (resolution) layering are inefficient, and therefore discrete formats are necessary.

Further, it would be desirable to provide enhancements to resolution, image clarity, coding efficiency, and video production efficiency. The present invention provides such enhancements.

SUMMARY

The invention provides a number of enhancements to handle a variety of video quality and compression problems. The following describes a number of such enhancements, most of which are preferably embodied as a set of tools which can be applied to the tasks of enhancing images and compressing such images. The tools can be combined by a content developer in various ways, as desired, to optimize the visual quality and compression efficiency of a compressed data stream, particularly a layered compressed data stream.

Such tools include improved de-interlacing and noise reduction enhancements, including motion analysis.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
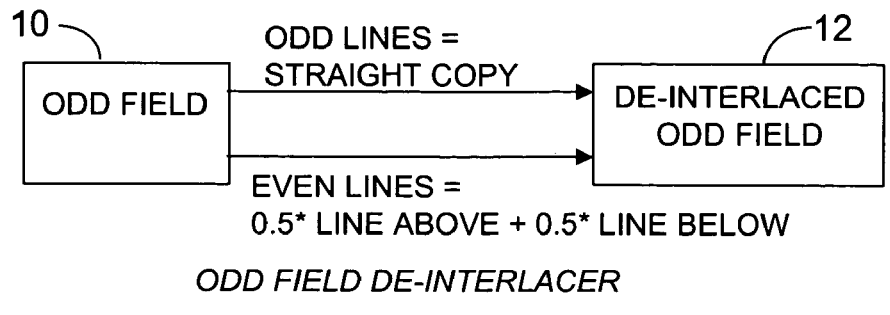
FIG. 1A is a block diagram of an odd-field de-interlacer.

Throughout this description, the preferred embodiment and examples shown should be considered as exemplars, rather than as limitations on the invention.

A number of enhancements may be made to handle a variety of video quality and compression problems. The following describes a number of such enhancements, most of which are preferably embodied as a set of tools which can be applied to the tasks of enhancing images and compressing such images. The tools can be combined by a content developer in various ways, as desired, to optimize the visual quality and compression efficiency of a compressed data stream, particularly a layered compressed data stream.

De-Interlacing and Noise Reduction Enhancements

Overview

Experimentation has shown that many de-interlacing algorithms and devices depend upon the human eye to integrate fields to create an acceptable result. However, since compression algorithms are not a human eye, any integration of de-interlaced fields should take into account the characteristics of such algorithms. Without such careful de-interlaced integration, the compression process will create high levels of noise artifacts, both wasting bits (hindering compression) as well as making the image look noisy and busy with artifacts. This distinction between de-interlacing for viewing (such as with line-doublers and line-quadruplers) vs. de-interlacing as input to compression, has lead to the techniques described below. In particular, the de-interlacing techniques described below are useful as input to single-layer non-interlaced MPEG-like, as well as to the layered MPEG-like compression.

Further, noise reduction must similarly match the needs of being an input to compression algorithms, rather than just reducing noise appearance. The goal is generally to reproduce, upon decompression, no more noise than the original camera or film-grain noise. Equal noise is generally considered acceptable, after compression/decompression. Reduced noise, with equivalent sharpness and clarity with the original, is a bonus. The noise reduction described below achieves these goals.

Further, for very noisy shots, such as from high speed film or with high camera sensitivity settings, usually in low light, noise reduction can be the difference between a good looking compressed/decompressed image vs. one which is unwatchably noisy. The compression process greatly amplifies noise which is above some threshold of acceptability to the compressor. Thus, the use of noise-reduction pre-processing to keep noise below this threshold may be required for acceptable good quality results.

De-Graining and Noise-Reducing Filters

It has been found through experimentation that applying de-graining and/or noise-reducing filtering before layered or non-layered encoding improves the ability of the compression system to perform. While de-graining or noise-reduction is most effective on grainy or noisy images prior to compression, either process may be helpful when used in moderation even on relatively low noise or low grain pictures. Any of several known de-graining or noise-reduction algorithms may be applied. Examples are "coring", simple neighbor median filters, and softening filters.

Whether noise-reduction is needed is determined by how noisy the original images are. For interlaced original images, the interlace itself is a form of noise, which usually will require additional noise reduction filtering, in addition to the complex de-interlacing process described below. For progressive scan (non-interlaced) camera or film images, noise processing is useful in layered and non-layered compression when noise is present above a certain level.

There are different types of noise. For example, video transfers from film include film grain noise. Film grain noise is caused by silver grains which couple to yellow, cyan, and magenta film dyes. Yellow affects both red and green, cyan affects both blue and green, and magenta affects both red and blue. Red is formed where yellow and magenta dye crystals overlap. Similarly green is the overlap of yellow and cyan, and blue is the overlap of magenta and cyan. Thus, noise between colors is partially correlated through the dyes and grains between pairs of colors. Further, when multiple grains overlap in all three colors, as they do in a print dark regions of the image or on a negative in light regions of the image (dark on the negative), additional color combinations occur. This correlation between the colors can be utilized in film-grain noise reduction, but is a complex process. Further, many different film types are used, and each type has different grain sizes, shapes, and statistical distributions.

For video images created by CCD-sensor and other (e.g., tube) sensor cameras, the red, green, and blue noise is uncorrelated. In this case, it is best to process the red, green, and blue records independently. Thus, red noise is reduced with self-red processing independently of green noise and blue noise; the same approach applies to green and blue noise.

Thus, noise processing is best matched to the characteristics of the noise source itself. In the case of a composite image (from multiple sources), the noise may differ in characteristics over different portions of the image. In this situation, generic noise processing may be the only option, if noise processing is needed.

It has also been found useful in some cases to perform a "re-graining" or "re-noising" process after decoding a compressed layered data stream, as a creative effect, since some de-grained or de-noised images may be "too clean" or "too sterile" in appearance. Re-graining and/or re-noising are relatively easy effects to add in the decoder using any of several known algorithms. For example, this can be accomplished by the addition of low pass filtered random noise of suitable amplitude.

De-Interlacing Before Compression

As mentioned above, the preferred compression method for interlaced source which is ultimately intended for non-interlaced display includes a step to de-interlace the interlaced source before the compression steps. De-interlacing a signal after decoding in the receiver, where the signal has been compressed in the interlaced mode, is both more costly and less efficient than de-interlacing prior to compression, and then sending a non-interlaced compressed signal. The non-interlaced compressed signal can be either layered or non-layered (i.e., a conventional single layer compression).

Experimentation has shown that filtering a single field of an interlaced source, and using that field as if it were a non-interlaced full frame, gives poor and noisy compression results. Thus, using a single-field de-interlacer prior to compression is not a good approach. Instead, experimentation has shown that a three-field-frame de-interlacer process using field synthesized frames ("field-frames"), with weights of [0.25, 0.5, 0.25] for the previous, current, and next field-frames, respectively, provides a good input for compression. Combining three field-frames may be performed using other weights (although these weights are optimal) to create a de-interlaced input to a compression process.

In the preferred de-interlacing system, a field-de-interlacer is used as the first step in the overall process to create field-frames. In particular, each field is de-interlaced, creating a synthesized frame where the total number of lines in the frame is derived from the half number of lines in a field. Thus, for example, an interlaced 1080 line image will have 540 lines per even and odd field, each field representing 1/60th of a second. Normally, the even and odd fields of 540 lines will be interlaced to create 1080 lines for each frame, which represents 1/30th of a second. However, in the preferred embodiment, the de-interlacer copies each scanline without modification from a specified field (e.g., the odd fields) to a buffer that will hold some of the de-interlaced result. The remaining intermediate scanlines (in this example, the even scanlines) for the frame are synthesized by adding half of the field line above and half of the field line below each newly stored line. For example, the pixel values of line 2 for a frame would each comprise ½ of the summed corresponding pixel values from each of line 1 and line 3. The generation of intermediate synthesized scanlines may be done on the fly, or may be computed after all of the scanlines from a field are stored in a buffer. The same process is repeated for the next field, although the field types (i.e., even, odd) will be reversed.

Figure 1B:
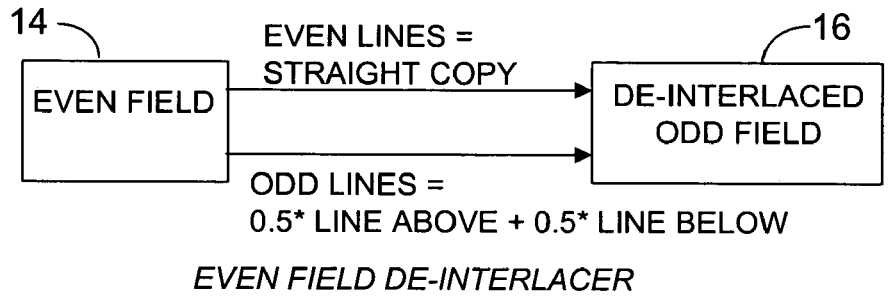
FIG. 1B is a block diagram of an even-field de-interlacer.

FIG. 1A is a block diagram of an odd-field de-interlacer, showing that the odd lines from an odd field 10 are simply copied to a de-interlaced odd field 12, while the even lines are created by averaging adjacent odd lines from the original odd field together to form the even lines of the de-interlaced odd field 12. Similarly, FIG. 1B is a block diagram of an even-field de-interlacer, showing that the even lines from an even field 14 are simply copied to a de-interlaced even field 16, while the odd lines are created by averaging adjacent even lines from the original even field together to form the odd lines of the de-interlaced even field 16. Note that this case corresponds to "top field first"; "bottom field first" could also be considered the "even" field.

Figure 2:
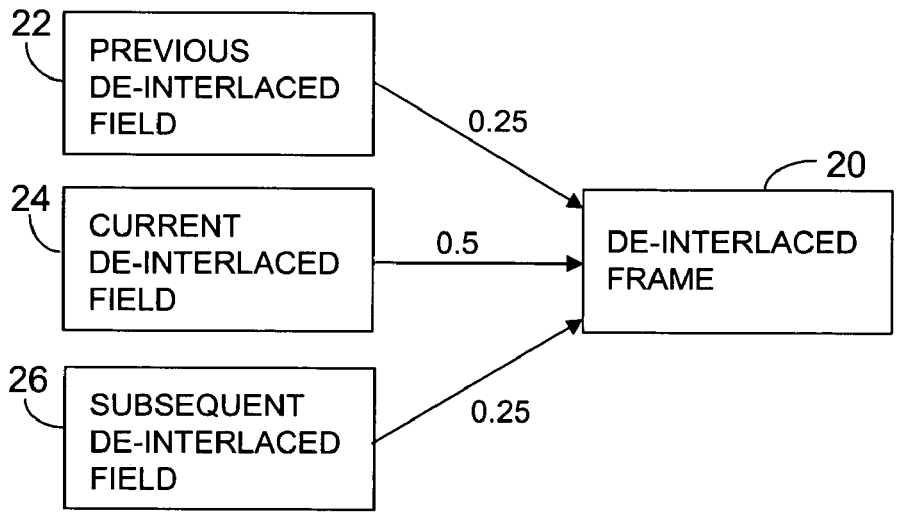
FIG. 2 is a block diagram of a frame de-interlacer using three de-interlaced fields.

As a next step, a sequence of these de-interlaced fields is then used as input to a three-field-frame de-interlacer to create a final de-interlaced frame. FIG. 2 is a block diagram showing how the pixels of each output frame are composed of 25% of the corresponding pixels from a previous de-interlaced field (field-frame) 22, 50% of the corresponding pixels from a current field-frame 24, and 25% of the corresponding pixels from the next field-frame 26.

The new de-interlaced frame then contains much fewer interlace difference artifacts between frames than do the three field-frames of which it is composed. However, there is a temporal smearing by adding the previous field-frame and next field-frame into a current field-frame. This temporal smearing is usually not objectionable, especially in light of the de-interlacing improvements which result.

This de-interlacing process is very beneficial as input to compression, either single layer (unlayered) or layered. It is also beneficial just as a treatment for interlaced video for presentation, viewing, or making still frames, independent of use with compression. The picture from the de-interlacing process appears "clearer" than the presentation of the interlace directly, or of the de-interlaced fields.

De-Interlace Thresholding

Although the de-interlace three-field sum weightings of [0.25, 0.5, 0.25] discussed above provide a stable image, moving parts of a scene can sometimes become soft or can exhibit aliasing artifacts. To counteract this, a threshold test may be applied which compares the result of the [0.25, 0.5, 0.25] temporal filter against the corresponding pixel values of only the middle field-frame. If a middle field-frame pixel value differs more than a specified threshold amount from the value of the corresponding pixel from the three-field-frame temporal filter, then only the middle field-frame pixel value is used. In this way, a pixel from the three-field-frame temporal filter is selected where it differs less than the threshold amount from the corresponding pixel of the single de-interlaced middle field-frame, and the middle field-frame pixel value is used when there is more difference than the threshold. This allows fast motion to be tracked at the field rate, and smoother parts of the image to be filtered and smoothed by the three-field-frame temporal filter. This combination has proven an effective, if not optimal, input to compression. It is also very effective for processing for direct viewing to de-interlace image material (also called line doubling in conjunction with display).

Figure 3:
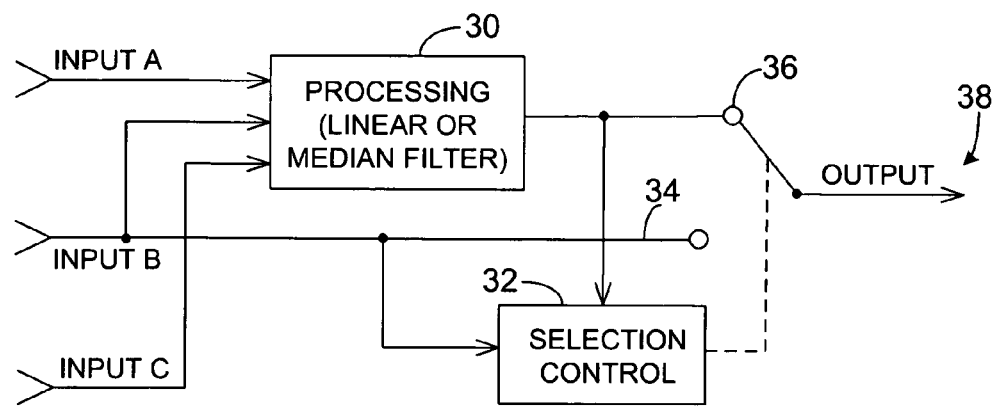
FIG. 3 is a block diagram of a threshold test

The preferred embodiment for such threshold determinations uses the following equations for corresponding RGB color values from the middle (single) de-interlaced field-frame image and the three-field-frame de-interlaced image:

$Rdiff = R\_single\_field\_de\text{-}interlaced \text{ minus } R\_three\_field\_de\text{-}interlaced$ $Gdiff = G\_single\_field\_de\text{-}interlaced \text{ minus } G\_three\_field\_de\text{-}interlaced$ $Bdiff = B\_single\_field\_de\text{-}interlaced \text{ minus } B\_three\_field\_de\text{-}interlaced$ $ThresholdingValue = abs(Rdiff + Gdiff + Bdiff) + abs(Rdiff) + abs(Gdiff) + abs(Bdiff)$ The ThresholdingValue is then compared to a threshold setting. Typical threshold settings are in the range of 0.1 to 0.3, with 0.2 being most common. FIG. 3 shows a block diagram of this threshold test. The PROCESSING block 30 multiplies the inputs by [0.25, 0.5, 0.25] and sums the results. The SELECTION CONTROL block 32 compares the output 36 of the PROCESSING block 30 with Input B 34 using the above equations for Rdiff, Gdiff, Bdiff, and ThresholdingValue. The switch selects the PROCESSING output 36 if the ThresholdingValue is less than the threshold, otherwise the switch selects Input B 34, the middle value, for the output 38.

In order to remove noise from this threshold, smooth-filtering the three-field-frame and single-field-frame de-interlaced pictures can be used before comparing and thresholding them. This smooth filtering can be accomplished simply by down filtering (e.g., down filtering by two), and then up filtering (e.g., using a gaussian up-filter by two). This "down-up" smoothed filter can be applied to both the single-field-frame de-interlaced picture and the three-field-frame de-interlaced picture. The smoothed single-field-frame and three-field-frame pictures can then be compared to compute a ThresholdingValue and then thresholded to determine which picture will source each final output pixel.

In particular, the threshold test is used as a switch to select between the single-field-frame de-interlaced picture and the three-field-frame temporal filter combination of single-field-frame de-interlaced pictures. This selection then results in an image where the pixels are from the three-field-frame de-interlacer in those areas where that image differs in small amounts (i.e., below the threshold) from the single field-frame image, and where the pixels are from the single field-frame image in those areas where the three-field-frame differed more than then the threshold amount from the single-field-frame de-interlaced pixels (after smoothing).

This technique has proven effective in preserving single-field fast motion details (by switching to the single-field-frame de-interlaced pixels), while smoothing large portions of the image (by switching to the three-field-frame de-interlaced temporal filter combination).

In addition to selecting between the single-field-frame and three-field-frame de-interlaced image, it is also often beneficial to add a bit of the single-field-frame image to the three-field-frame de-interlaced picture, to preserve some of the immediacy of the single field pictures over the entire image. This immediacy is balanced against the temporal smoothness of the three-field-frame filter. A typical blending is to create new frame by adding 33.33% (⅓) of a single middle field-frame to 66.67% (⅔) of the corresponding three-field-frame smoothed image. This can be done before or after threshold switching, since the result is the same either way, only affecting the smoothed three-field-frame picture. Note that this is effectively equivalent to using a different proportion of the three field-frames, rather than the original three-field-frame weights of [0.25, 0.5, 0.25]. Computing ⅔ of [0.25, 0.5, 0.25] plus ⅓ of (0,1,0), yields [0.1667, 0.6666, 0.1667] as the temporal filter for the three field-frames. The more heavily weighted center (current) field-frame brings additional immediacy to the result, even in the smoothed areas which fell below the threshold value. This combination has proven effective in balancing temporal smoothness with immediacy in the de-interlacing process for moving parts of a scene.

Use of Linear Filters

Sums, filters, or matrices involving video pictures should take into account the fact that pixel values in video are non-linear signals. For example, the video curve for HDTV can be several variations of coefficients and factors, but a typical formula is the international CCIR XA-11 (now called Rec. 709):

$$V=1.0993*L^{0.45}-0.0993 \text{ for } L>0.018051$$

$$V=4.5*L \text{ for } L<=0.018051$$

where V is the video value and L is linear light luminance.

The variations adjust the threshold (0.018051) a little, the factor (4.5) a little (e.g. 4.0), and the exponent (0.45) a little (e.g., 0.4). The fundamental formula, however, remains the same.

A matrix operation, such as a RGB to/from YUV conversion, implies linear values. The fact that MPEG in general uses the video non-linear values as if they were linear results in leakage between the luminance (Y) and the color values (U, and V). This leakage interferes with compression efficiency. The use of a logarithmic representation, such as is used with film density units, corrects much of this problem. The various types of MPEG encoding are neutral to the non-linear aspects of the signal, although its efficiency is effected due to the use of the matrix conversion RGB to/from YUV.YUV (U=R−Y, V=B−Y) should have Y computed as a linearized sum of 0.59 G, plus 0.29 R, plus 0.12 B (or slight variations on these coefficients). However, U (=R−Y) becomes equivalent to R/Y in logarithmic space, which is orthogonal to luminance. Thus, a shaded orange ball will not vary the U (=R−Y) parameter in a logarithmic representation. The brightness variation will be represented completely in the Luminance parameter, where full detail is provided.

The linear vs. logarithmic vs. video issue impacts filtering. A key point to note is that small signal excursions (e.g. 10% or less) are approximately correct when a non-linear video signal is processed as if it were a linear signal. This is because a piece-wise linear approximation to the smooth video-to-from-linear conversion curve is reasonable. However, for large excursions, a linear filter is much more effective, and produces much better image quality. Accordingly, if large excursions are to be optimally coded, transformed, or otherwise processed, it would be desirable to first convert the non-linear signal to a linear one in order to be able to apply a linear filter.

De-interlacing is therefore much better when each filter and summation step utilizes conversions to linear values prior to filtering or summing. This is due to the large signal excursions inherent in interlaced signals at small details of the image. After filtering, the image signals are converted back to the non-linear video digital representation. Thus, the three-field-frame weighting (e.g., [0.25, 0.5, 0.25] or [0.1667, 0.6666, 0.1667]) should be performed on a linearized video signal. Other filtering and weighted sums of partial terms in noise and de-interlace filtering should also be converted to linear form for computation. Which operations warrant linear processing is determined by signal excursion, and the type of filtering. Image sharpening can be appropriately computed in video or logarithmic non-linear representations, since it is self-proportional. However, matrix processing, spatial filtering, weighted sums, and de-interlace processing should be computed using linearized digital values.

As a simple example, the single field-frame de-interlacer described above computes missing alternate lines by averaging the line above and below each actual line. This average is much more correct numerically and visually if this average is done linearly. Thus, instead of summing 0.5 times the line above plus 0.5 times the line below, the digital values are linearized first, then averaged, and then reconverted back into the non-linear video representation.

Median Filters

In noise processing, the most useful filter is the median filter. A three element median filter just ranks the three entries, via a simple sort, and picks the middle one. For example, an X (horizontal) median filter looks at the red value (or green or blue) of three adjacent horizontal pixels, and picks the one with the middle-most value. If two are the same, that value is selected. Similarly, a Y (vertical) filter looks in the scanlines above and below the current pixel, and again picks the middle value.

It has been experimentally determined that it is useful to average the results from applying both an X and a Y median filter to create a new noise-reducing component picture (i.e., each new pixel is the 50% equal average of the X and Y medians for the corresponding pixel from a source image).

In addition to X and Y (horizontal and vertical) medians, it is also possible to take diagonal and other medians. However, the vertical and horizontal pixel values are most close physically to any particular pixel, and therefore produce less potential error or distortion than the diagonals. However, such other medians remain available in cases where noise reduction is difficult using only the vertical and horizontal medians.

Another beneficial source of noise reduction is information from the previous and subsequent frame (i.e., a temporal median). As mentioned below, motion analysis provides the best match for moving regions. However, it is compute intensive. If a region of the image is not moving, or is moving slowly, the red values (and green and blue) from a current pixel can be median filtered with the red value at that same pixel location in the previous and subsequent frames. However, odd artifacts may occur if significant motion is present and such a temporal filter is used. Thus, it is preferred that a threshold be taken first, to determine whether such a median would differ more than a selected amount from the value of a current pixel. The threshold can be computed essentially the same as for the de-interlacing threshold above:

$Rdiff=R\_current\_pixel \text{ minus } R\_temporal\_median$ $Gdiff=G\_current\_pixel \text{ minus } G\_temporal\_median$ $Bdiff=B\_current\_pixel \text{ minus } B\_temporal\_median$ $ThresholdingValue=abs(Rdiff+Gdiff+Bdiff)+abs(Rdiff)+abs(Gdiff)+abs(Bdiff)$ The ThresholdingValue is then compared to a threshold setting. Typical threshold settings are in the range 0.1 to 0.3, with 0.2 being typical. Above the threshold, the current value is kept. Below the threshold, the temporal median is used. The block diagram of FIG. 3 also applies to this threshold test. In this case the PROCESSING block 30 is a temporal median filter and the inputs are three successive frames. The SELECTION CONTROL block 32 compares the output 36 of the PROCESSING block 30 with Input B 34 using the above equations for Rdiff, Gdiff, Bdiff, and ThresholdingValue. The switch selects the PROCESSING output 36 if the ThresholdingValue is less than the threshold, otherwise the switch selects Input B 34, the middle value, for the output 38.

An additional median type is a median taken between the X, Y, and temporal medians. Another median type can take the temporal median, and then take the equal average of the X and Y medians from it.

Each type of median can cause problems. X and Y medians smear and blur an image, so that it looks "greasy". Temporal medians cause smearing of motion over time. Since each median can result in problems, yet each median's properties are different (and, in some sense, "orthogonal"), it has been determined experimentally that the best results come by combining a variety of medians.

Figure 4:
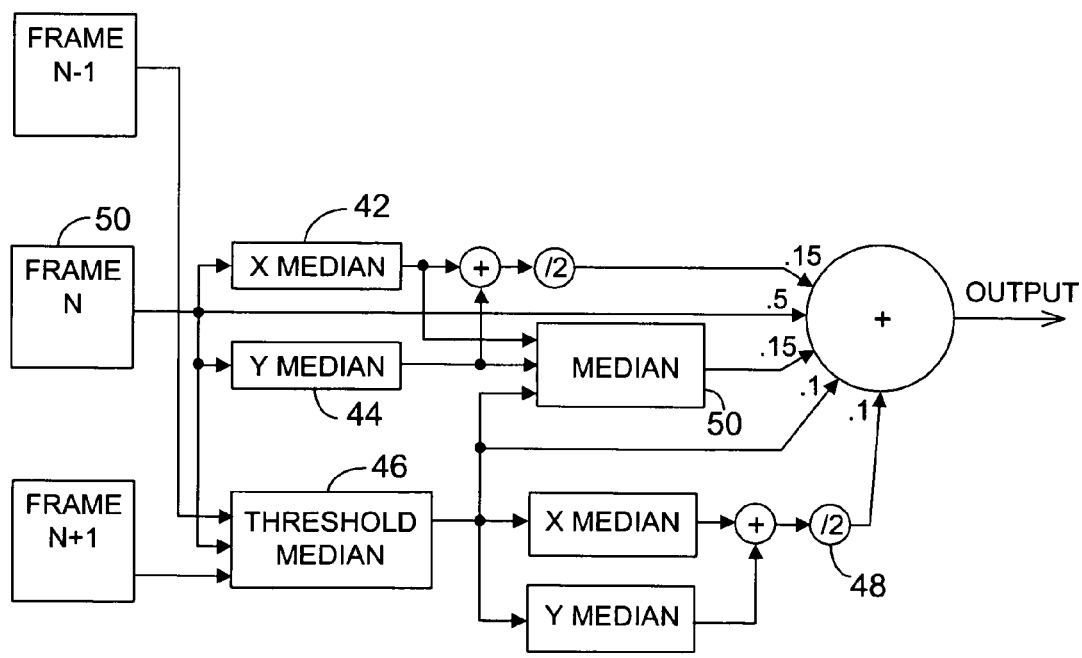
FIG. 4 is a block diagram of a preferred combination of median filters Like reference symbols in the various drawings indicate like elements.

In particular, FIG. 4 shows a preferred combination of medians is a linear weighted sum (see the discussion above on linear video processing) of five terms to determine the value for each pixel of a current image:

50% of the original image (Frame N 40) (thus, the most noise reduction is 3 db, or half);

15% of the average of X and Y medians 42, 44, respectively;

10% of the thresholded temporal median 46;

10% of the average of X and Y medians of the thresholded temporal median (48); and 15% of a three-way X, Y, and temporal median (50).

This set of time medians does a reasonable job of reducing the noise in the image without making it appear "greasy" or blurred, causing temporal smearing of moving objects, or losing detail. Another useful weighting of these five terms is 35%, 20%, 22.5%, 10%, and 12.5%, respectively.

In addition, it is useful to apply motion-compensation by applying center weighted temporal filters to a motion-compensated n×n region, as described below. This can be added to the median filtered image result (of five terms, just described) to further smooth the image, providing better smoothing and detail on moving image regions.

Motion Analysis

In addition to "in-place" temporal filtering, which does a good job at smoothing slow-moving details, de-interlacing and noise reduction can also be improved by use of motion analysis. Adding the pixels at the same location in three fields or three frames is valid for stationary objects. However, for moving objects, if temporal averaging/smoothing is desired, it is often more optimal to attempt to analyze prevailing motion over a small group of pixels. For example, an n×n block of pixels (e.g., 2×2, 3×3, 4×4, 6×6, or 8×8) can be used to search in previous and subsequent fields or frames to attempt to find a match (in the same way MPEG-2 motion vectors are found by matching 16×16 macroblocks). Once a best match is found in one or more previous and subsequent frames, a "trajectory" and "moving mini-picture" can be determined. For interlaced fields, it is best to analyze comparisons as well as compute inferred moving mini-pictures utilizing the results of the thresholded de-interlaced process above. Since this process has already separated the fast-moving from the slow-moving details, and has already smoothed the slow moving details, the picture comparisons and reconstructions are more applicable than individual de-interlaced fields.

The motion analysis preferably is performed by comparison of an n×n block in the current thresholded de-interlaced image with all nearby blocks in the previous and subsequent one or more frames. The comparison may be the absolute value of differences in luminance or RGB over the n×n block. One frame is sufficient forward and backward if the motion vectors are nearly equal and opposite. However, if the motion vectors are not nearly equal and opposite, then an additional one or two frames forward and backward can help determine the actual trajectory. Further, different de-interlacing treatments may be useful in helping determine the "best guess" motion vectors going forward and back. One de-interlacing treatment can be to use only individual de-interlaced fields, although this is heavily prone to aliasing and artifacts on small moving details. Another de-interlacing technique is to use only the three-field-frame smooth de-interlacing, without thresholding, having weightings [0.25, 0.5, 0.25], as described above. Although details are smoothed and sometimes lost, the trajectory may often be more correct.

Once a trajectory is found, a "smoothed n×n block" can be created by temporally filtering using the motion-vector-offset pixels from the one (or more) previous and subsequent frames. A typical filter might again be [0.25, 0.5, 0.25] or [0.1667, 0.6666, 0.1667] for three frames, and possibly [0.1, 0.2, 0.4, 0.2, 0.1] for two frames back and forward. Other filters, with less central weight, are also useful, especially with smaller block sizes (such as 2×2, 3×3, and 4×4). Reliability of the match between frames is indicated by the absolute difference value. Large minimum absolute differences can be used to select more center weight in the filter. Lower values of absolute differences can suggest a good match, and can be used to select less center weight to more evenly distribute the average over a span of several frames of motion-compensated blocks.

These filter weights can be applied to: individual de-interlaced motion-compensated field-frames; thresholded three-field-frame de-interlaced pictures, described above; and non-thresholded three-field-frame de-interlaced images, with a [0.25, 0.5, 0.25] weighting, also as described above. However, the best filter weights usually come from applying the motion-compensated block linear filtering to the thresholded three-field-frame result described above. This is because the thresholded three-field-frame image is both the smoothest (in terms of removing aliasing in smooth areas), as well as the most motion-responsive (in terms of defaulting to a single de-interlaced field-frame above the threshold). Thus, the motion vectors from motion analysis can be used as the inputs to multi-frame or multi-de-interlaced-field-frame or single-de-interlaced field-frame filters, or combinations thereof. The thresholded multi-field-frame de-interlaced images, however, form the best filter input in most cases.

The use of motion analysis is computationally expensive for a large search region, when fast motion might be found (such as ±32 pixels). Accordingly, it may be best to augment the speed by using special-purpose hardware or a digital signal processor assisted computer.

Once motion vectors are found, together with their absolute difference measure of accuracy, they can be utilized for the complex process of attempting frame rate conversion. However, occlusion issues (objects obscuring or revealing others) will confound matches, and cannot be accurately inferred automatically. Occlusion can also involve temporal aliasing, as can normal image temporal undersampling and its beat with natural image frequencies (such as the "backward wagon wheel" effect in movies). These problems often cannot be unraveled by any known computation technique, and to date require human assistance. Thus, human scrutiny and adjustment, when real-time automatic processing is not required, can be used for off-line and non-real-time frame-rate conversion and other similar temporal processes.

De-interlacing is a simple form of the same problem. Just as with frame-rate-conversion, the task of de-interlacing is theoretically impossible to perform perfectly. This is especially due to the temporal undersampling (closed shutter), and an inappropriate temporal sample filter (i.e., a box filter). However, even with correct samples, issues such as occlusion and interlace aliasing further ensure the theoretical impossibility of correct results. The cases where this is visible are mitigated by the depth of the tools, as described here, which are applied to the problem. Pathological cases will always exist in real image sequences. The goal can only be to reduce the frequency and level of impairment when these sequences are encountered. However, in many cases, the de-interlacing process can be acceptably fully automated, and can run unassisted in real-time. Even so, there are many parameters which can often benefit from manual adjustment.

Filter Smoothing of High Frequencies

In addition to median filtering, reducing high frequency detail will also reduce high frequency noise. However, this smoothing comes at the price of loss of sharpness and detail. Thus, only a small amount of such smoothing is generally useful. A filter which creates smoothing can be easily made, as with the threshold for de-interlacing, by down-filtering with a normal filter (e.g., truncated sinc filter) and then up-filtering with a gaussian filter. The result will be smoothed because it is devoid of high frequency picture detail. When such a term is added, it typically must be in very small amounts, such as 5% to 10%, in order to provide a small amount of noise reduction. In larger amounts, the blurring effect generally becomes quite visible.

Base Layer Noise Filtering

The filter parameters for the median filtering described above for an original image should be matched to the noise characteristics of the film grain or image sensor that captured the image. After this median filtered image is down-filtered to generate an input to the base layer compression process, it still contains a small amount of noise. This noise may be further reduced by a combination of another X-Y median filters (equally averaging the X and Y medians), plus a very small amount of the high frequency smoothing filter. A preferred filter weighting of these three terms, applied to each pixel of the base layer, is:

75% of the original base layer (down filtered from median-filtered original above);

22.5% of the average of X and Y medians; and 7.5% of the down-up smoothing filter.

This small amount of additional filtering in the base layer provides a small additional amount of noise reduction and improved stability, resulting in better MPEG encoding and limiting the amount of noise added by such encoding.

COMPUTER IMPLEMENTATION

The invention may be implemented in hardware or software, or a combination of both. However, preferably, the invention is implemented in computer programs executing on one or more programmable computers each comprising at least a processor, a data storage system (including volatile and non-volatile memory and/or storage elements), an input device, and an output device. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer system, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, while the preferred embodiment uses MPEG-2 or MPEG-4 coding and decoding, the invention will work with any comparable standard that provides equivalents of I, P, and/or B frames and layers. Accordingly, it is to be understood that the invention is not to be limited by the specific illustrated embodiment, but only by the scope of the appended claims.

What is claimed is:

1. A method for enhancing image quality in an image encoding system, including:

applying a temporal median filter to corresponding pixel values of a previous digital video image, a current digital video image, and a next digital video image to create a noise-reduced digital video image;

comparing the difference between each corresponding pixel value of each noise-reduced digital video image and each corresponding current digital video image to a threshold value to generate a difference value; and selecting, for each final pixel value for the noise-reduced digital video image, a corresponding pixel value from the current digital video image if the difference value is within a first threshold comparison range, and a corresponding pixel value from the noise-reduced digital video image if the difference value is within a second threshold comparison range.

2. A method for enhancing image quality in an image encoding system, including:

applying a temporal median filter to corresponding pixel values of a previous digital video image, a current digital video image, and a next digital video image to create a noise-reduced digital video image;

comparing the difference between each corresponding pixel value of each noise-reduced digital video image and each corresponding current digital video image to a threshold value to generate a difference value; and selecting, for each final pixel value for the noise-reduced digital video image, a corresponding pixel value from the current digital video image if the difference value is within a first threshold comparison range, and a corresponding pixel value from the noise-reduced digital video image if the difference value is within a second threshold comparison range, wherein the threshold value is selected from the range of approximately 0.1 to approximately 0.3.

3. A method for enhancing image quality in an image encoding system, including creating a noise-reduced digital video image comprising a linear weighted sum of five terms:
   a current digital video image;
   an average of horizontal and vertical medians of the current digital video image;
   a thresholded temporal median;
   an average of horizontal and vertical medians of the thresholded temporal median; and
   a median of the thresholded temporal median and horizontal and vertical medians of the current digital video image,
   wherein the weights of the five terms are approximately 50%, 15%, 10%, 10%, and 15%, respectively.

4. A method for enhancing image quality in an image encoding system, including creating a noise-reduced digital video image comprising a linear weighted sum of five terms:
   a current digital video image;
   an average of horizontal and vertical medians of the current digital video image;
   a thresholded temporal median;
   an average of horizontal and vertical medians of the thresholded temporal median; and
   a median of the thresholded temporal median and horizontal and vertical medians of the current digital video image,
   wherein the weights of the five terms are approximately 35%, 20%, 22.5%, 10%, and 12.5%, respectively.

5. A method for enhancing image quality in an image encoding system, including:
   creating a noise-reduced digital video image comprising a linear weighted sum of five terms:
      a current digital video image;
      an average of horizontal and vertical medians of the current digital video image;
      a thresholded temporal median;
      an average of horizontal and vertical medians of the thresholded temporal median; and
      a median of the thresholded temporal median and horizontal and vertical medians of the current digital video image;
   determining a motion vector for each n×n pixel region of the current digital video image with respect to at least one previous digital video image and at least one subsequent digital video image;
   applying a center weighted temporal filter to each n×n pixel region of the current digital video image and corresponding motion-vector offset n×n pixel regions of the at least one previous digital video image and at least one subsequent digital video image to create a motion-compensated image; and
   adding the motion-compensated image to the noise-reduced digital video image.

6. A method for enhancing image quality in an image encoding system, including:
   determining a motion vector for each n×n pixel region of a current digital video image with respect to at least one previous digital video image and at least one subsequent digital video image; and
   applying a center weighted temporal filter to each n×n pixel region of the current digital video image and corresponding motion-vector offset n×n pixel regions of the at least one previous digital video image and at least one subsequent digital video image to create a motion-compensated image,
   wherein each digital video image is a three-field-frame de-interlaced image.

7. A method for enhancing image quality in an image encoding system, including:
   determining a motion vector for each n×n pixel region of a current digital video image with respect to at least one previous digital video image and at least one subsequent digital video image; and
   applying a center weighted temporal filter to each n×n pixel region of the current digital video image and corresponding motion-vector offset n×n pixel regions of the at least one previous digital video image and at least one subsequent digital video image to create a motion-compensated image,
   wherein each digital video image is a thresholded three-field-frame de-interlaced image.

8. A method for enhancing image quality in an image encoding system, including:
   determining a motion vector for each n×n pixel region of a current digital video image with respect to at least one previous digital video image and at least one subsequent digital video image; and
   applying a center weighted temporal filter to each n×n pixel region of the current digital video image and corresponding motion-vector offset n×n pixel regions of the at least one previous digital video image and at least one subsequent digital video image to create a motion-compensated image,
   wherein the center weighted temporal filter is a three-image temporal filter having weights for each of such images of approximately 25%, 50%, and 25%, respectively.

9. A method for enhancing image quality in an image encoding system, including:
   determining a motion vector for each n×n pixel region of a current digital video image with respect to at least one previous digital video image and at least one subsequent digital video image; and
   applying a center weighted temporal filter to each n×n pixel region of the current digital video image and corresponding motion-vector offset n×n pixel regions of the at least one previous digital video image and at least one subsequent digital video image to create a motion-compensated image,
   wherein the center weighted temporal filter is a five-image temporal filter having weights for each of such images of approximately 10%, 20%, 40%, 20%, and 10%, respectively.

10. A method for enhancing image quality in an image encoding system, including:
    applying a normal down filter to an image to create a first intermediate image;
    applying a Gaussian up filter to the first intermediate image to create a second intermediate image; and
    adding a weighted fraction of the second intermediate image to a selected image to create an image having reduced high frequency noise.

11. The method of claim 10, wherein the weighted fraction is between approximately 5% and 10% of the second intermediate image.

* * * * *